W. A. DUNCAN.
ELECTRIC STEAM PRESSURE COOKER.
APPLICATION FILED MAR. 14, 1922.
1,422,348.
Patented July 11, 1922.
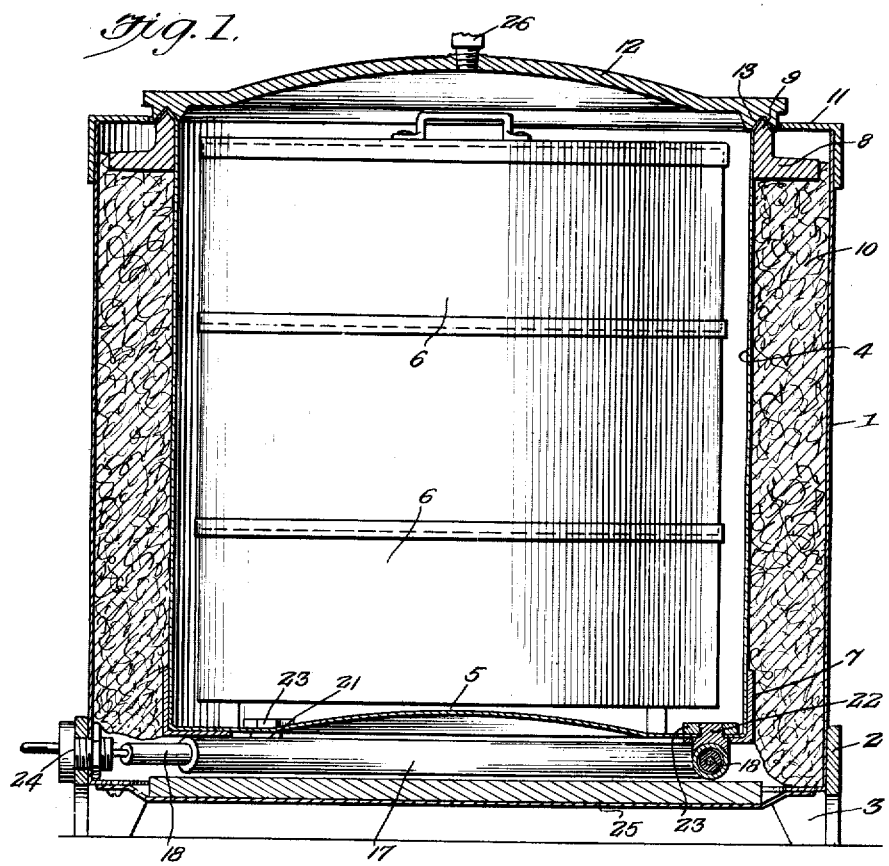
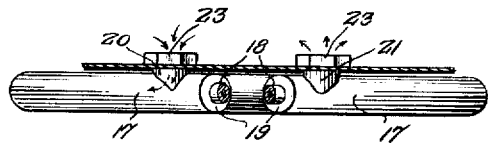
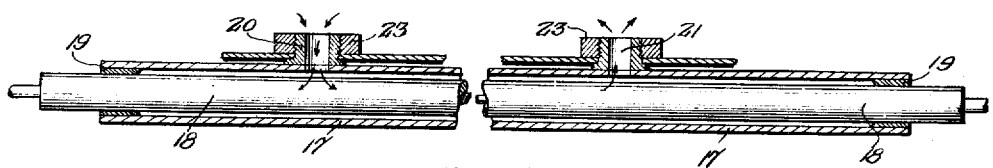

W. A. DUNCAN.
ELECTRIC STEAM PRESSURE COOKER.
APPLICATION FILED MAR. 14, 1922.
1,422,348.
Patented July 11, 1922.
2 SHEETS—SHEET 2.
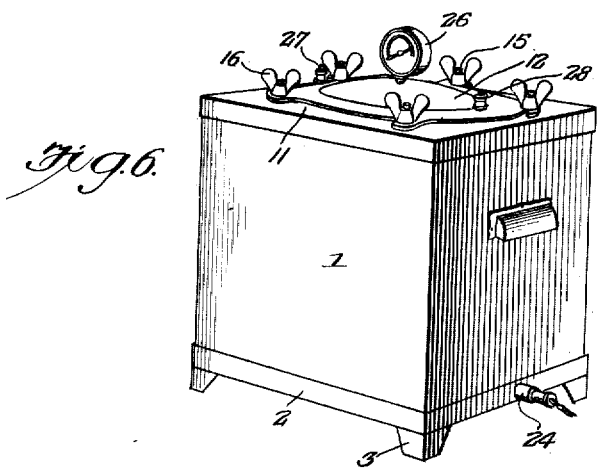
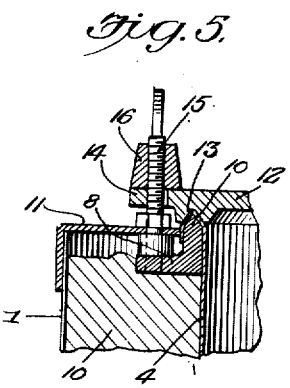
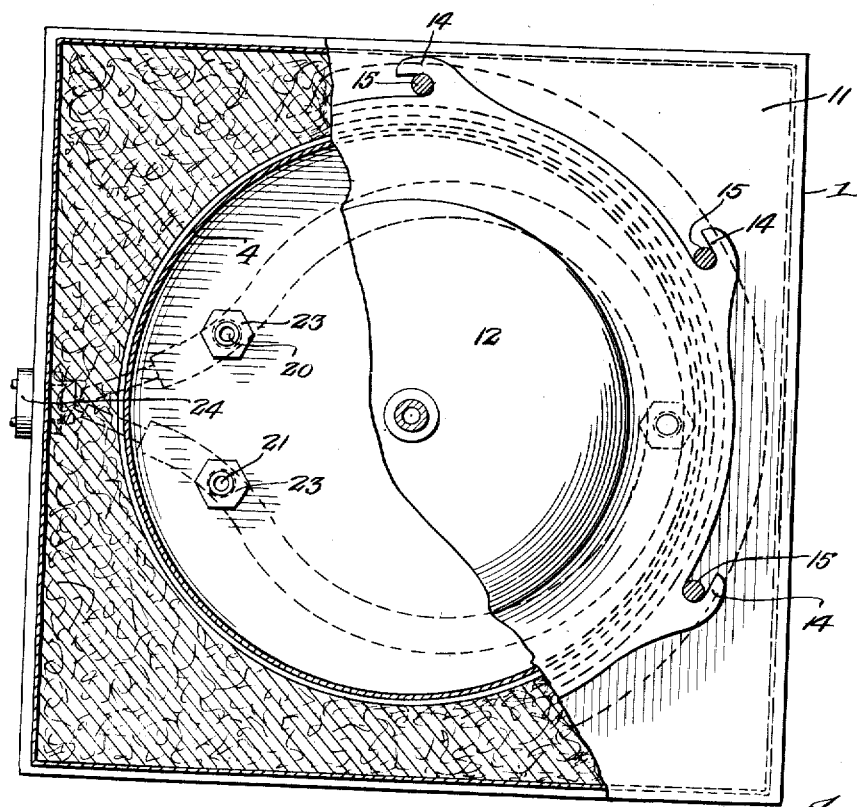

UNITED STATES PATENT OFFICE.

WAYNE A. DUNCAN, OF CHICAGO, ILLINOIS.

ELECTRIC STEAM-PRESSURE COOKER.

1,422,348.   Specification of Letters Patent.   Patented July 11, 1922.

Application filed March 14, 1922. Serial No. 543,757.

*To all whom it may concern:*

Be it known that I, WAYNE A. DUNCAN, a citizen of the United States, residing at Chicago, county of Cook, State of Illinois, have invented certain new and useful Improvements in Electric Steam - Pressure Cookers; and I do hereby declare the following to be a full, clear, and exact description of the invention, such as will enable others skilled in the art to which it appertains to make and use the same.

This invention relates to certain improvements in cookers and particularly to an electric steam pressure cooker of the domestic type.

The present invention contemplates the use of an electric heating element associated with a steam generating coil or the like arranged at the bottom of a receptacle properly insulated in a manner similar to a fireless cooker, said receptacle being provided with a specially designed top or closure to prevent the escape of the steam generated, and at all times maintain the desired pressure within the cooker.

Cooking with electricity is well known and it also is not new to associate an electric heating element with a cooking receptacle of the fireless cooker type, but in practically all of such cases merely the heat alone is used for the cooking, no provision being made to establish and maintain a steam pressure within the cooker and to use this steam pressure as the cooking medium.

With the above purpose in view the principal object of the present invention is to provide an economical and expeditious means of generating and maintaining the desired steam pressure within the cooker by the use of an electric heating element associated with an appropriate water circulating unit in a particular manner to be hereinafter more fully described.

Another object is to construct the top or closure of the cooker, particularly where it joins said cooker, so that there will be no escape of generated steam and the necessary steam pressure will be maintained throughout the cooking process.

The preferred embodiment of the invention is illustrated in the accompanying drawings, in which:

Fig. 1 is a vertical cross-sectional view of the assembled device.

Fig. 2 is a view partly in plane and transverse section.

Figs. 3 and 4 are detail views of the electrical heating unit employed.

Fig. 5 is a detail sectional view illustrating the manner of clamping the top or closure to the cooking receptacle, and Fig. 6 is a perspective view of the complete device.

Referring to the drawings in detail, the cooker comprises an outer receptacle or casing 1, preferably square and constructed of sheet metal, the lower corner edges of which being supplied with a bracing or finishing band 2, terminating at the four corners of the said receptacle in supporting legs or the like 3, more clearly shown in Fig. 6.

Positioned within the casing 1 is a cylinder 4, preferably of aluminum, having a concave bottom 5 and adapted to receive the various cooking vessels or the like 6. Encircling the bottom edge portion of the cylinder 4 is a reinforcing flanged ring or band 7 of sufficient size to withstand an internal pressure of approximately twenty - five pounds. Encircling the upper edge of said cylinder 4 is an annular casting 8 substantially L-shape in cross section, the upper edge of said casting 8 being provided with a converging double tapered edge 9 over which the extreme upper edge of the cylinder 4 is swaged or turned as clearly shown in Figs. 1 and 5.

Interposed between the outer casing 1 and the cylinder 4 is packed the necessary insulating material 10, such as mineral wool or the like, after which a flanged cover piece or finishing member 11 is placed in position on top of the receptacle between the outer edge thereof and the upper edge of the cylinder 4.

The cylinder 4 is provided with an aluminum cover or closure 12, the under peripheral edge of which being provided with an annular V-shaped recess 13 to conform to the double taper 9 provided around the upper edge of the reinforcing ring 8. The extreme outer peripheral edge of the closure 12 is provided with a series of hooked lugs or the like 14, adapted to engage cooperating studs or bolts 15 projecting upwardly from the ring or casting 8, shown in detail in Fig. 5. With this arrangement a slight rotation of the closure 12 to engage the lugs 14 with the studs or bolts 15 will cause the initial securing of the cover to the cylinder 4. To completely lock the cover in place and insure a steam tight joint therebetween and the cylinder 4, the studs 15 are provided with clamping wing nuts or the like 16, whereby the said closure is wedged in place in an obvious manner.

Removably mounted in the bottom of the cooker immediately below the cylinder 4 is a steam generating hollow coil or the like 17, having positioned therein an electrical heating unit 18, said electrical heating unit extending from each end of the coil 17 at which point the said coil is sealed as at 19 to prevent the escape of water or steam from said coil at these points.

This steam generating unit is suspended from the bottom of the cylinder 4 by a series of threaded connections 20, 21 and 22, each being provided with a lock nut 23. The connections 20 and 21 are hollow and communicate with the steam generating coil 17 whereby the necessary circulation of incoming water and discharging steam is maintained. The connection 22 is solid and merely performs the function of a means of supporting the opposite end of the coil.

The outer ends of the electrical heating unit 18 are secured to a connector plug 24 positioned in the bottom outside edge of the cooker whereby the necessary electrical connection may be established.

The outside casing 1, of the cooker, is provided with a removable false bottom 25 whereby the steam generating coil and electrical heating unit may be removed when desired for inspection or repair.

For determining the pressure of steam within the cooker the closure 12 is provided with a steam pressure gauge 26 and in order to control this pressure said closure is also provided with air and steam regulating valves 27 and 28, respectively whereby the proper pressure may be maintained according to the necessary requirements for the particular food being cooked.

In the present apparatus hereinbefore described, as distinguished from previous constructions of both electrical and steam cookers, steam pressure is employed to perform the cooking operation, whereas in said previous constructions merely the heat alone is used, no means being provided to maintain the desired steam pressure within the cooker, which is possible with applicant's cooker, owing to the means for sealing the closure to the cooking cylinder by clamping the same thereto.

This steam can be quickly and continuously supplied to the cooking cylinder by reason of the novel construction and combination therewith, of the electrically heated steam generated unit employed in the present arrangement.

By the present invention applicant has made it possible to adapt steam pressure cooking to domestic use in a practical, efficient and attractive manner, the food being cooked more thoroughly and in a much quicker time than possible heretofore in similar devices, and thereby greatly reducing the expense of operation.

What I claim is:

1. In an electric steam pressure cooker, the combination with an insulated heat retaining receptacle, of a water circulating unit, an electric heater for converting said water into steam, means for permitting the escape of the steam from the water circulating unit into the receptacle, and a steam tight closure for said receptacle.

2. In an electric steam pressure cooker, the combination with an insulated heat retaining receptacle, of a water circulating unit arranged in the bottom of said receptacle, an electric heating element enclosed within said water circulating unit for converting the water into steam, means for admitting cold water to said water circulating unit, means for permitting the escape of steam therefrom into the receptacle, and a steam tight joint between the closure and the receptacle and means for clamping or maintaining said closure in position on said receptacle.

3. In an electric steam pressure cooker, the combination with an insulated heat retaining receptacle, of a curved tubular water circulating unit arranged in the bottom of said receptacle, an electrical heater enclosed within said water circulating unit for converting the water into steam, means for connecting the source of electrical current to said heater, connections carried by said water circulating unit for admitting a supply of cold water and permitting the escape of steam to and from said unit, respectively, a tapered edge formed around the top of said receptacle and a closure having an annular recess adapted to be forced into engagement with said tapered edge providing a steam tight joint between said closure and receptacle to maintain the desired steam pressure within the receptacle.

4. An electric steam pressure cooker, the combination with a heat retaining insulated receptacle, of a water circulating unit, an electric heater for converting said water into steam, means for permitting the escape of the steam from the water circulating unit into the receptacle, a tapered edge formed around the top of said receptacle, a closure having an annular recess adapted to fit over said tapered edge, hooked lugs carried by the outer peripheral edge of said closure, and clamping bolts adapted to cooperate with said lugs for forcing and securing said closure in place providing a steam tight joint to maintain the desired steam pressure within the receptacle.

5. An electric steam pressure cooker, the combination with a heat retaining insulated receptacle, of a water circulating unit, an electric heater for converting said water into steam, means for permitting the escape of the steam from the water circulating unit into the receptacle, a tapered edge formed around the top of said receptacle, a closure having an annular recess adapted to fit over said tapered edge, hooked lugs carried by the outer peripheral edge of said closure, clamping bolts adapted to cooperate with said lugs for forcing and securing said closure in place against the pressure of the steam at the top of the receptacle, a pressure indicator carried by said closure, and a pressure retaining reinforceing ring positioned around the bottom of said receptacle.

In testimony whereof I affix my signature.

WAYNE A. DUNCAN.